Nov. 10, 1931.  W. S. PIERCE, JR  1,831,392
FASTENING DEVICE
Filed April 25, 1929
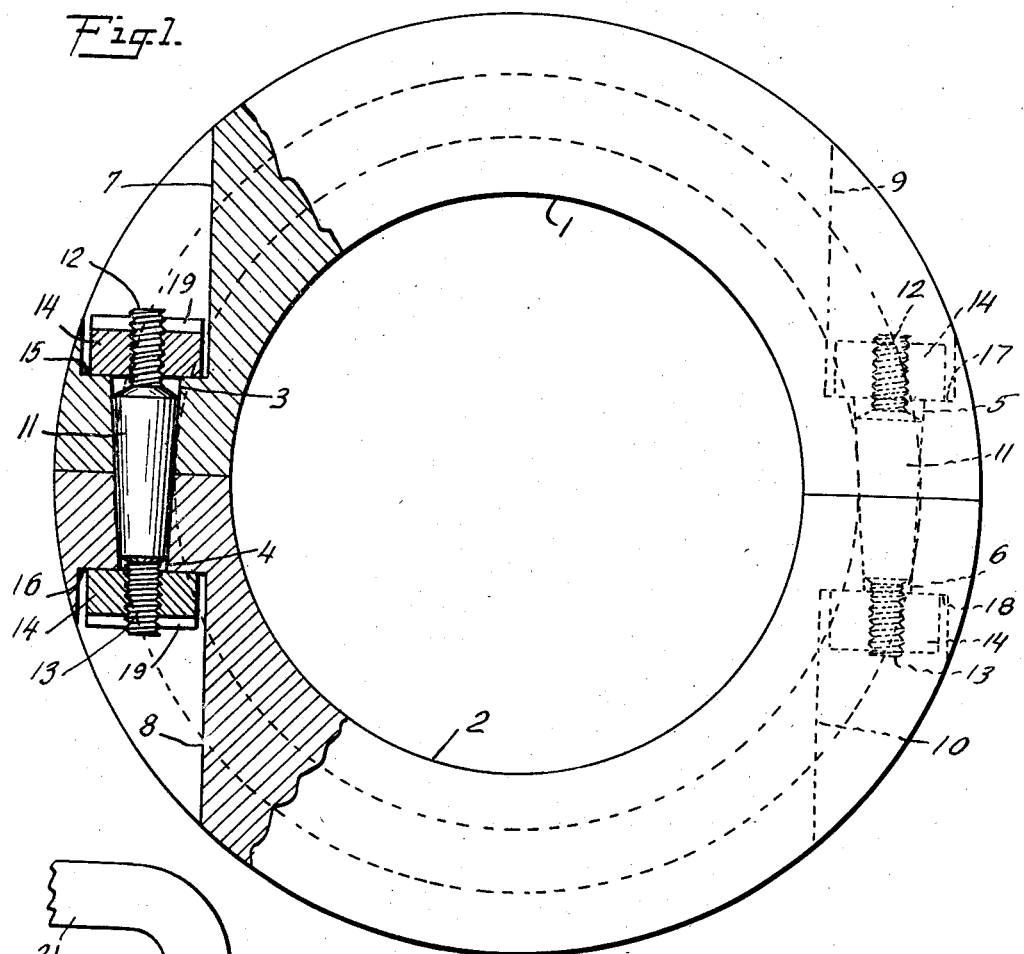
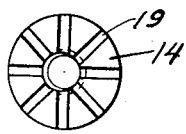
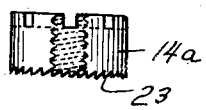
INVENTOR
Winslow S. Pierce Jr.
BY
Pennie, Davis, Marvin & Edmonds
HIS ATTORNEYS Patented Nov. 10, 1931

1,831,392

UNITED STATES PATENT OFFICE

WINSLOW S. PIERCE, JR., OF BAYVILLE, NEW YORK, ASSIGNOR TO SPLIT BALLBEARING CORPORATION, OF LEBANON, NEW HAMPSHIRE, A CORPORATION OF NEW HAMPSHIRE

FASTENING DEVICE

Application filed April 25, 1929. Serial No. 358,019.

This invention relates to machine parts and more particularly concerns improved fastening means for firmly connecting and accurately aligning a plurality of machine parts in predetermined relative positions.

It is often necessary to connect two or more parts of machines or structures in such a manner that the parts are not only securely connected, but are accurately disposed in predetermined relative positions. For example, pulleys, gears, bearing parts and collars, for use on shafts or axles, are often split or formed in two or more parts so that they can be assembled around the shaft at the desired point without disturbing the shaft connections or bearings. In order that such parts may properly cooperate with the belts, gears or bearing parts which engage therewith, the separate portions thereof must be accurately aligned in proper relative positions as well as securely fastened together about the shaft. The usual method of obtaining accurate alignment and secure connection is to employ separate aligning and connecting means. Thus dowel pins or other tapered or specially formed means are used to align the parts, while bolts, nuts and other similar means are employed to fasten the parts together. The constructions of the type described are unsatisfactory for various reasons. The tapered aligning means become worn in use and are thus incapable of accurately aligning the parts. Further, in many constructions the space in which the securing and aligning means can be disposed is extremely limited and separate securing and aligning means cannot be provided without weakening the machine parts or producing a bulky and clumsy construction. In fact, in certain cases where small bearing surfaces are to be connected, it is impossible to provide separate aligning and fastening means within the space available.

With the above and other considerations in mind, it is proposed in accordance with the present invention to provide connecting means for machine parts in which a single element performs the combined function of mechanically connecting the parts and accurately aligning the parts in a predetermined relative position. The invention further contemplates the provision of a connecting and aligning means of very compact construction, which may be readily disposed in a limited space. The invention also includes improved locking means for the connections as well as improved means for tightening and loosening the connections.

The combined connecting and aligning means of the invention comprises generally a tapered stud fitted into cooperating tapered openings in two or more machine parts. Each stud is drawn into wedging engagement with the sides of such openings by means of a suitable nut carried on a threaded portion at the end of the stud. When the improved fastening means is to be employed in connection with machine parts in which very little space is available, the invention contemplates the provision of suitable recesses communicating with the tapered openings in the parts for the reception of each nut, whereby the nuts may be conveniently disposed below the surfaces of the parts. According to one embodiment of the invention, the nuts are provided with integral locking means for preventing the displacement thereof, and improved wrench engaging means and a wrench for manipulating the nuts are also preferably provided.

Various other objects, advantages and characteristic features of the invention will become apparent as the description thereof progresses.

In describing the invention in detail, reference will be made to the accompanying drawings, in which;

Figure 1 is a side view, partly in section, of a two-part ball race embodying a connecting means constructed in accordance with the present invention;

Fig. 2 shows a nut of a type suitable for use on the fastening means shown in Figure 1, together with a wrench for engagement therewith and operation thereof;

Fig. 3 is a top view of a nut shown in Figure 2; and

Fig. 4 shows a nut provided with locking means in accordance with one embodiment of the invention.

Referring to the drawings, one embodiment of my improved connecting means has been shown in connection with a split ball race comprising two semi-circular parts, 1 and 2, designed to be clamped on a shaft, spindle or axle. As shown in Fig. 1, the parts 1 and 2 are respectively provided with two tapered circular openings 3, 4, 5 and 6. These openings are so disposed that when the openings 3 and 5 on the part 1 are respectively accurately aligned with the openings 4 and 6 on the part 2, the surfaces of the parts 1 and 2 are accurately aligned to present an unbroken bearing surface for cooperation with the balls and other elements of the bearing structure. In the disclosed embodiment of the invention, the parts 1 and 2 are provided with recesses 7, 8, 9 and 10 in their outer surfaces, these recesses being appreciably larger in diameter than the openings 3, 4, 5 and 6 with which they respectively communicate.

The fastening means comprise studs 11 having the same taper as the openings 3, 4, 5 and 6 and provided with threaded end portions 12 and 13 as shown. Nuts 14 are provided for engagement with the threaded end portions 12 and 13 of the studs 11, and these nuts engage the shoulders 15, 16, 17 and 18 at the bottoms of the recesses 7, 8, 9 and 10 respectively when drawn up on the studs.

One end face of each nut 14 is preferably castellated or provided with recesses 19 of any suitable type for engagement by similarly formed abutments or extensions 20 on a wrench or other tool W. The wrench W is preferably provided with a handle 21 extending at right angles from the axis of the nut engaging head 22 thereof, whereby considerable pressure can be applied to the nut when in its fully engaged position within one of the recesses 7, 8, 9 or 10.

The operation of the connecting means disclosed is readily apparent from the description given. The two parts 1 and 2 of the ball race are assembled around the shaft, and the two tapered studs 11 are passed respectively through the tapered cooperating openings 3 and 4, and 5 and 6. A nut 14 is then applied to the threaded extension adjacent the smaller end of each stud 11 and these nuts are drawn up tightly against the shoulders 16 and 18 at the bottoms of the recesses 8 and 10, the wrench W being employed for this purpose. The tightening of the nuts 14 draws the tapered studs 11 into wedging engagement with the sides of the openings 3, 4, 5 and 6, thereby accurately aligning the openings and the surfaces of the parts 1 and 2. Another nut 14 is then applied to the threaded extension 12 adjacent the larger end of each stud 11, and is drawn tight by means of the wrench W. In this manner, the parts 1 and 2 are not only securely connected by strong fastener means, but are accurately aligned in the desired relative position.

As explained above, the studs 11 are machined to exactly the same angle of taper as the openings 3, 4, 5 and 6, and thus the tightening of the nut 14 at the smaller end of each stud draws the parts 1 and 2 into very accurate alignment by exerting lateral forces on the parts through the taper of the stud. Although the lateral forces exerted by the taper of the stud are very great, the forces exerted longitudinally of the stud between the two machine parts 1 and 2 by reason of the nut 14 at the smaller end of the stud acting through the stud taper is not alone sufficiently great to permanently hold the parts in intimate engagement during use. The reason for this is readily apparent. With identical angles of taper on the stud and the openings it is impossible to axially elongate the stud or put it in tension by means of the nut 14 at the smaller end alone, such elongation being prevented by the stud taper. Thus, the parts cannot be compressively clamped together by the nut at the smaller end of the stud. If a fixed head were employed on the larger end of the stud, the inner face of such head would have to be vary accurately disposed axially of the stud and the shoulders 15 and 17 would have to be very accurately located if any appreciable axial elongation of the stud by the nut at the smaller end thereof were to be obtained. Thus, it would be necessary that the fixed head be disposed at such a position axially of the stud with respect to the taper thereof that when the nut 14 at the smaller end was drawn up, the head would first engage the shoulder 15 or 17 and upon subsequent axial elongation of the stud, the tapered sides thereof would engage the tapered bore of the opening. It is practically impossible to execute the accurate machining necessary for this arrangement, and further, the arrangement is undesirable in that the machine parts are first clamped together and subsequently an attempt to obtain accurate alignment is made. This procedure is often fatal to the accurate alignment of the parts, since the frictional engagement between the parts caused by the initial clamping action resists the subsequent aligning action of the taper.

In the device of the present invention, the above described difficulties are entirely eliminated by employing a nut 14 at the larger end of the stud, which nut acts as a movable bolt head and effects the desired axial elongation of the stud and consequent clamping together of the parts after accurate alignment has been established by the stud taper. Thus, the tightening of the nut 14 at the smaller end of the stud acts through the stud taper and aligns the parts, and the subsequent tightening of the nut at the larger end puts the stud in axial tension and securely clamps the parts together. With this arrangement, it is only necessary that the angle of taper of the stud and the openings be identical, and other precision machining operations on the fastening device may be dispensed with.

In one form of the invention, the nuts are preferably provided with suitable integral locking means for preventing the loosening thereof due to vibration or other causes. In the disclosed embodiment of the invention, this locking means takes the form of a plurality of radially extending sharp edged teeth or projecting ridges 23 formed on the bearing face of the nut 14a, as shown in Fig. 4. When a nut of this type is tightened upon a threaded extension of the stud 11, the teeth 23 bite into the metal of the machine part, in this case the surface of one of the shoulders, 15, 16, 17 or 18 and thereby lock the nut securely in position against accidental misplacement. The teeth 23 may be of the ratchet type so that the turning of the nut in a releasing direction is more effectively prevented.

The connecting means of the present invention presents many advantageous features. The tapered studs perform the double function of aligning and firmly connecting machine parts without complicating the construction thereof. Due to the simplicity of the connecting means it may be readily employed on machine parts where the available space is very limited and where it is essential that no part of the connecting means extend beyond the surface of the parts to be connected. The nuts at the small ends of the studs wedge the studs firmly against the tapered sides of the openings when the parts are assembled, and when it is desired to disconnect the parts, these nuts may be loosened and removed and the nuts at the large end of the studs tightened, whereupon the studs will be readily and easily freed from the tapered openings.

Although only one embodiment of the invention has been described, it should be understood that the invention includes all such variations from the disclosed structure as fall within the scope of the appended claim. For example, the connecting means described may be applied to many machine parts other than the split ball race shown, the tapered studs and openings may be square or of various other sections, the recesses for the reception of the nuts may be omitted, various nut locking means other than the disclosed ratchet teeth may be employed and various other changes, modifications or omissions may be made without departing from the scope of the invention.

I claim:

The combination with a plurality of machine parts having tapered openings of the same angle of taper therein of a headless stud having and angle of taper equal to the angle of taper of said openings and registering in said openings, said stud having threaded portions at each end thereof, a nut engaging the threaded portion at the smaller end of said stud for first clamping said stud against the sides of said opening and thereby accurately aligning said parts and a nut engaging the threaded portion at the larger end of said stud for putting said stud in axial tension after said parts have been aligned and thereby securely clamping said parts together.

In testimony whereof I affix my signature.

WINSLOW S. PIERCE, Jr.